(12) United States Patent
Bhushan et al.

(10) Patent No.: US 12,068,641 B2
(45) Date of Patent: Aug. 20, 2024

(54) MOTOR HOTSPOT IDENTIFICATION

(71) Applicant: LiveWire EV, LLC, Milwaukee, WI (US)

(72) Inventors: Swaroop Bhushan, San Jose, CA (US); Don Suranga D. Uduwage, San Jose, CA (US)

(73) Assignee: LiveWire EV, LLC, Milwaukee, WI (US)

( * ) Notice: Subject to any disclaimer, the term of this patent is extended or adjusted under 35 U.S.C. 154(b) by 253 days.

(21) Appl. No.: 17/841,014

(22) Filed: Jun. 15, 2022

(65) Prior Publication Data
US 2023/0412051 A1    Dec. 21, 2023

(51) Int. Cl.
| | | |
|---|---|---|
| *G05F 1/66* | (2006.01) | |
| *H02K 11/25* | (2016.01) | |
| *H02K 11/33* | (2016.01) | |
| *H02P 6/08* | (2016.01) | |
| *H02P 29/60* | (2016.01) | |

(52) U.S. Cl.
CPC ............. *H02K 11/25* (2016.01); *H02K 11/33* (2016.01); *H02P 6/08* (2013.01); *H02P 29/60* (2016.02)

(58) Field of Classification Search
CPC .......... G05F 1/66; H02P 29/664; H02P 29/60; H02P 6/08; H02K 11/25; H02K 11/33
See application file for complete search history.

(56) References Cited

U.S. PATENT DOCUMENTS

| | | |
|---|---|---|
| 3,183,294 A | 5/1965 | Kasper |
| 4,376,280 A | 3/1983 | Davis et al. |
| 4,609,292 A | 9/1986 | Asano et al. |
| 4,676,665 A | 6/1987 | Twerdochlib |
| 5,227,703 A | 7/1993 | Boothe et al. |
| 5,422,517 A | 6/1995 | Verney et al. |
| 7,033,073 B2 | 4/2006 | Hoppe |
| 7,149,622 B2 | 12/2006 | Kim et al. |
| 7,454,985 B2 | 11/2008 | Marioni |
| 7,463,994 B2 | 12/2008 | Ohashi et al. |
| 7,839,108 B2 | 11/2010 | Patel et al. |
| 8,358,094 B2 | 1/2013 | Zettner |
| 8,421,391 B2 | 4/2013 | Yeh et al. |

(Continued)

*Primary Examiner* — Cortez M Cook
(74) *Attorney, Agent, or Firm* — Michael Best & Friedrich LLP (57) ABSTRACT

Methods, systems, and apparatuses for motor hotspot identification. One system includes a first motor installed in a vehicle, the first motor including a stator having at least one stator winding corresponding to one phase of the first motor. The system also includes a first set of temperature sensors coupled to the first motor and a controller. The controller receives a motor operating condition signal of the first motor, accesses a stored correlation model, and generates hypothetical temperature measurement data for a hypothetical temperature sensor of the first motor based on the stored correlation model and the motor operating condition signal. The stored correlation model is generated based on motor operating condition signals associated with a second motor operating in a test environment. In response to identifying a hotspot within the first motor based on the hypothetical temperature measurement data, the controller modifies operation of the first motor.

20 Claims, 7 Drawing Sheets

(56) References Cited

U.S. PATENT DOCUMENTS

| | | | |
|---|---|---|---|
| 8,487,575 B2 * | 7/2013 | Yeh | H02P 29/664 |
| | | | 318/432 |
| 9,176,010 B2 | 11/2015 | Reich et al. | |
| 9,698,660 B2 | 7/2017 | Reddy et al. | |
| 9,798,306 B2 * | 10/2017 | Kaufman | G05F 1/66 |
| 10,837,836 B2 | 11/2020 | Haslett et al. | |
| 10,847,350 B2 | 11/2020 | Kanno | |
| 2005/0180857 A1 | 8/2005 | Marioni | |
| 2010/0047089 A1 | 2/2010 | Booker et al. | |

\* cited by examiner

MOTOR HOTSPOT IDENTIFICATION

FIELD

Embodiments described herein generally relate to systems and methods for identifying hotspots within a motor. In particular, systems and methods described herein use a correlation model to map motor operating condition signals to temperature measurement data for a hypothetical temperature sensor, which reduces the number of temperature sensors needed to monitor motor temperature.

SUMMARY

The mechanical movement of components within a motor increases the temperature of the motor. Accordingly, this movement can cause the temperature of various components or areas of the motor to exceed ideal conditions. These areas of excessive temperature are often referred to as "hotspots." When such hotspots are identified, one or more corrective measures can be taken, such as motor derating.

Existing methods of identifying motor hotspots use multiple temperature sensors, such as thermocouples, mounted within a motor to directly measure motor temperature at various locations. However, accurately monitoring hotspots can be expensive, as directly measuring the temperature at a number of locations within the motor requires many temperature sensors, which add cost and complexity to a motor. Additionally, each temperature sensor included in a motor adds weight to the motor, which can adversely impact some uses of a motor, such as, for example, motors included in motorcycles where weight can impact performance.

Accordingly, embodiments described herein provide methods and systems for improved motor hotspot identification. As described in more detail below, embodiments described herein use a correlation model to accurately identify motor hotspots without requiring a large number of temperature sensors. Reducing the number of temperature sensors results in cost savings and weight reductions. As described in more detail below, in some embodiments, motor operating condition signals, such as, for example, a rotational speed (e.g., revolutions per minute (RPM)), a switching frequency, a phase current, a direct current (DC) bus voltage, a modulation index, a power factor, a coolant temperature, or a combination thereof, of a motor operating in a testing environment (a "test" motor) are monitored along with temperature measurement data generated by a plurality of temperature sensors (such as, for example, a plurality of thermocouples) mounted to the test motor. These motor operating condition signals are correlated with the temperature measurement data from the plurality of temperature sensors to generate a correlation model mapping motor operating conditions to the temperature readings of the plurality of temperature sensors. The generated correlation model is subsequently used in non-testing environments for an operating motor (including fewer temperature sensors than the test motor) to generate one or more hypothetical temperature measurements for the operating motor based on motor operating condition signals of the operating motor, thereby allowing motor hotspots to be identified in the operating motor using a reduced number of temperature sensors and, in some embodiments, without any temperature sensors for directly measuring a temperature of the operating motor.

For example, some embodiments provide a system for motor hotspot identification. The system includes a first motor installed in a vehicle, the first motor including a rotor and a stator having at least one stator winding corresponding to at least one phase of the first motor. The system also includes a first set of temperature sensors coupled to the first motor, and a controller installed in the vehicle. The controller is configured to receive a motor operating condition signal associated with the first motor, access a stored correlation model, and generate hypothetical temperature measurement data for a hypothetical temperature sensor based on the stored correlation model and the motor operating condition signal associated with the first motor. The stored correlation model is a model generated based on motor operating condition signals associated with a second motor operating in a test environment and temperature measurement data received from a second set of temperature sensors coupled to the second motor, wherein the first set of temperature sensors includes fewer temperature sensors than the second set of temperature sensors. The controller is also configured to, in response to identifying a hotspot within the first motor installed in the vehicle based on the hypothetical temperature measurement data, modify operation of the first motor.

Other embodiments provide a method of generating a correlation model for performing motor hotspot identification. The method includes receiving, with an electronic processor, from each of a plurality of temperature sensors coupled to a test motor, temperature measurement data and receiving, with the electronic processor, a motor operating condition signal associated with the test motor. The method also includes generating, with the electronic processor, a correlation model based on the temperature measurement data received from each of the plurality of temperature sensors and the motor operating condition signal associated with the test motor. The correlation model maps the motor operating condition signal to the temperature measurement data received from at least one of the temperature sensors of the plurality of temperature sensors. The method further includes deploying the generated correlation model to a vehicle including an operating motor, wherein the operating motor includes fewer temperature sensors than a number of temperature sensors included in the plurality of thermocouples and wherein the generated correlation model is configured to generate hypothetical temperature measurement data for the operating motor included in the vehicle based on a motor operating condition signal associated with the operating motor included in the vehicle. The hypothetical temperature measurement is used to detect a hotspot within the operating motor.

Yet further embodiments provide a non-transitory computer-readable medium storing instructions, that when executed by an electronic processor, perform a set of functions. The set of functions includes receiving, from an operating motor, a motor operating condition signal of the operating motor. The motor operating condition signal being at least one selected from a group consisting of a rotational speed (e.g., revolutions per minute (RPM)), a switching frequency, a phase current, a direct current (DC) bus voltage, a modulation index, a power factor, and a coolant temperature of the operating motor. The set of functions also includes generating, using a stored correlation model and the motor operating condition signal, hypothetical temperature measurement data for the operating motor for a hypothetical temperature sensor. The stored correlation model is a model generated based on motor operating condition signals associated with a test motor operating in a test environment and temperature measurement data received from a plurality of temperature sensors coupled to the test motor. The set of functions further includes detecting a hotspot within the operating motor based on the generated hypothetical temperature measurement data and regulating operation of the operating motor in response to detecting the hotspot.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments provided herein. The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic control units or controllers. It will be appreciated that these electronic control units or controllers may be comprised of one or more generic or specialized electronic processors, such as, for example, microprocessors, digital signal processors, customized processors, and field programmable gate arrays (FPGAs) and unique stored program instructions (including both software and firmware) that control the one or more electronic control units or controllers to implement the functionality described herein.

Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. Moreover, relational terms such as first and second, top and bottom, and the like may be used herein solely to distinguish one entity or action from another entity or action without necessarily requiring or implying any actual such relationship or order between such entities or actions.

As noted above, embodiments described in the present application provide systems and methods for identification of hotspots within a motor. Embodiments are described herein with respect to a motorcycle. However, it should be understood that the components and associated functionality described herein are not limited to motorcycles but can be used in any type of vehicle, such as, for example, a moped, an electric bicycle, a three-wheeled vehicle, a passenger vehicle, a semi-truck, or the like and may even be used for motors used in in non-vehicle applications.

Figure 1:
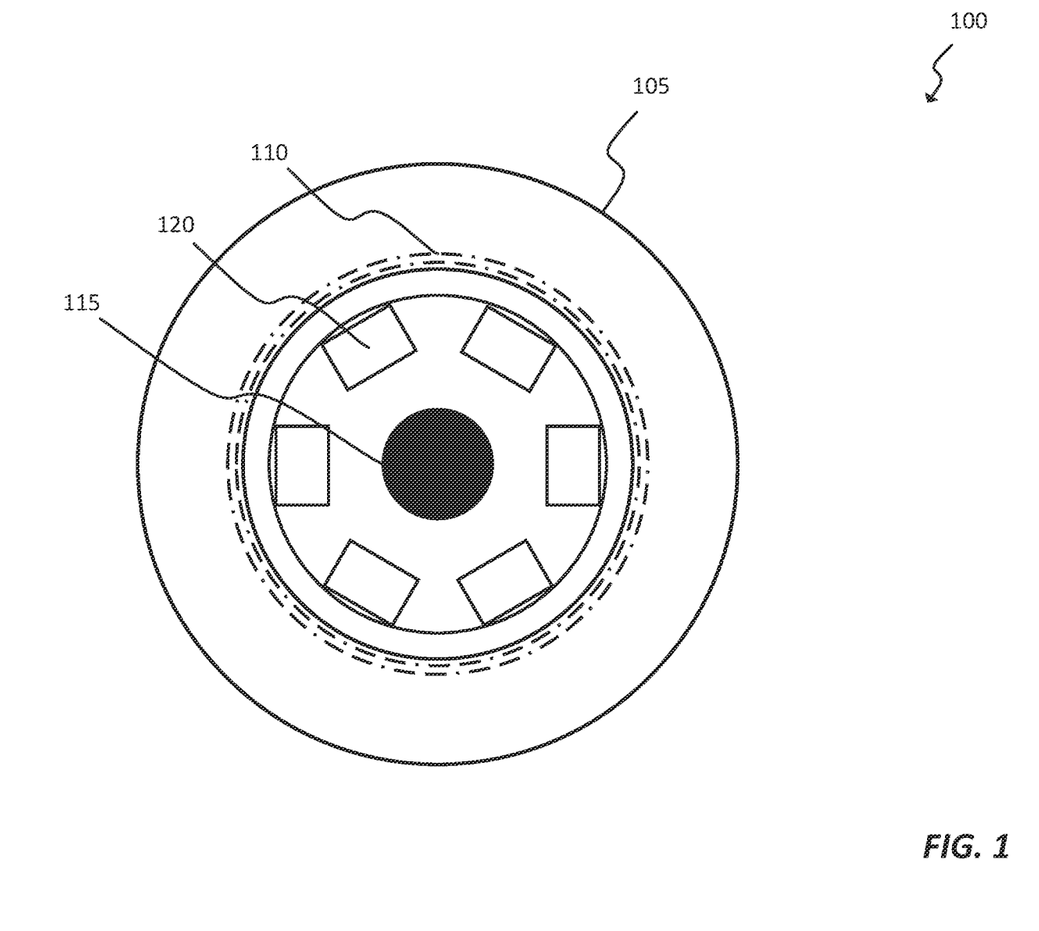
FIG. 1 is a cross-sectional view of a motor according to some embodiments.

FIG. 1 is a cross-sectional view of a motor 100 according to some embodiments. The motor 100 includes a stator 105. A plurality of stator windings 110 are positioned within the stator 105. The motor 100 also includes a rotor 115. In some embodiments, the rotor 115 includes a plurality of magnets 120. As noted above, movement of components within the motor 100 can create hotspots. For example, at high rotational speeds (e.g., revolutions per minute (RPMs)), stator windings 110 (or portions thereof) may generate heat beyond acceptable parameters. As also noted above, existing methods of identifying motor hotspots use multiple temperature sensors mounted within a motor to directly measure the temperature at various locations. This configuration, however, adds cost, complexity, and weight to a motor that may impact performance of the motor in particular applications, such as within a motorcycle, which has weight considerations.

Accordingly, embodiments described herein provide methods and systems for improved motor hotspot identification, wherein motor operating conditions signals are input to a correlation model to generate hypothetical temperature measurement data of one or more hypothetical temperature sensors, which allows fewer (and in some embodiments, no) temperature sensors to be included in the motor while still accurately identifying hot spots.

Figure 2:
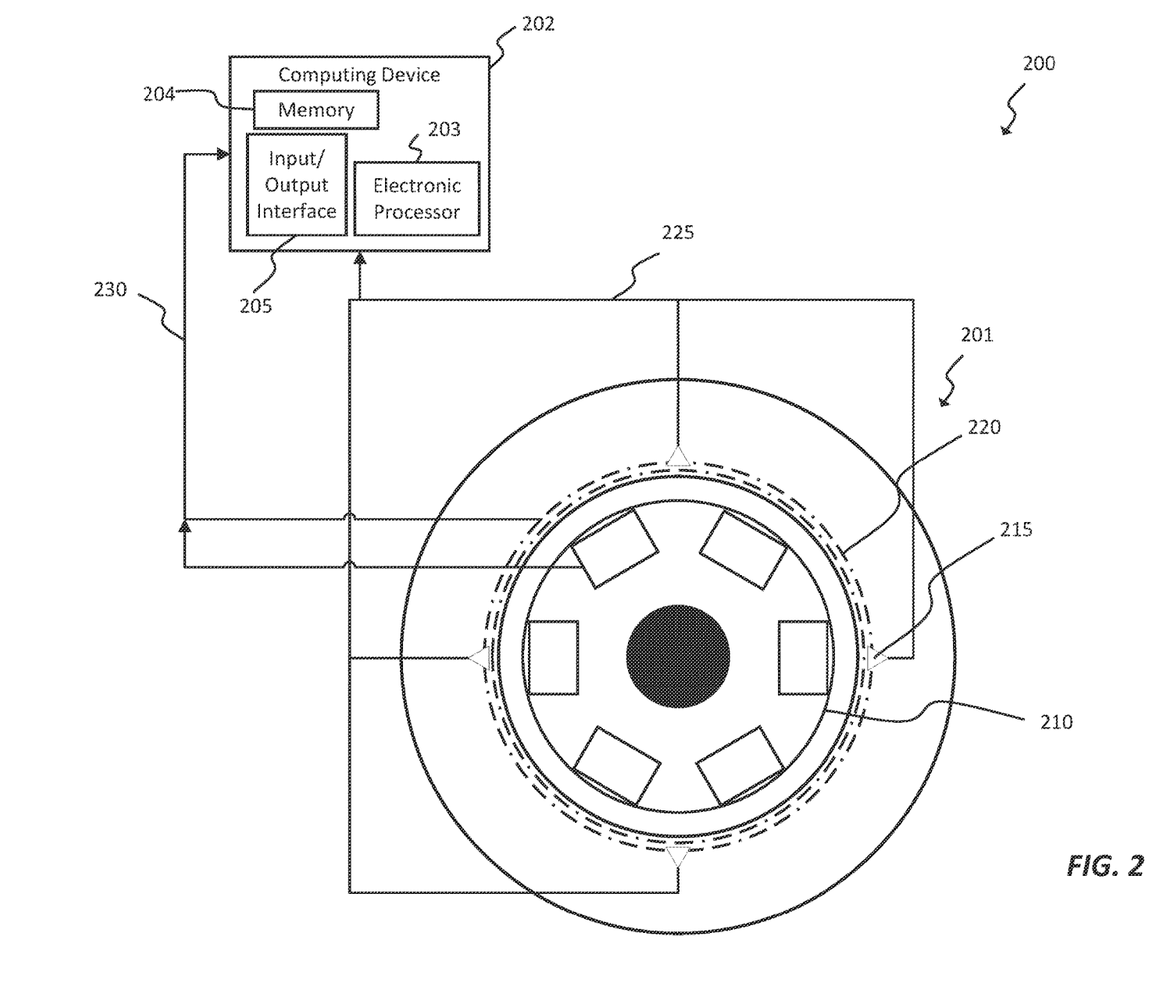
FIG. 2 schematically illustrates a system for building a correlation model according to some embodiments.

For example, FIG. 2 schematically illustrates a system 200 for generating a correlation model according to some embodiments. The system 200 includes a test motor 201 and a computing device 202. The computing device 202 includes an electronic processor 203, such as a microprocessor, an application-specific integrated circuit, or the like. Additionally, the computing device 202 includes non-transitory, computer-readable memory 204 and an input/output interface 205. In some embodiments, the memory 204 stores instructions executable by the electronic processor 203 to generate a correlation model as described herein. In some embodiments, the memory 204 also stores the generated correlation model as well as inputs received via the computing device 202.

The input/output interface 205 allows the computing device 202 to interface or communicate with the test motor 201 or components thereof. In some embodiments, the computing device 202 communicates with the test motor 201 and other components through an intermediary device. For example, in some embodiments, motor operating condition signals or temperature measurement data collected from the test motor 201 are saved to an intermediary memory device, such as, for example, a memory card, universal serial bus (USB), a hard drive, or the like, which the computing device 202 communicates with through the input/output interface 205.

The test motor 201 includes components similar to the motor 100 described above with respect to FIG. 1. In particular, as illustrated in FIG. 2, the test motor 201 includes a stator 206 including a plurality of windings 208. The test motor 201 also includes a rotor 210 including a plurality of magnets 212. In addition, the test motor 201 includes a plurality of temperature sensors 215, such as, for example, a plurality of thermocouples, mounted, for example, to the stator windings 208. The plurality of temperature sensors 215 sense and output or transmit temperature measurement data corresponding with the stator windings 208. In some embodiments, the plurality of temperature sensors 215 transmit temperature measurement data wirelessly. Alternatively or in addition, the plurality of temperature sensors 215 transmit temperature measurement data via a communication path 225. As also noted above, in some embodiments, the plurality of temperature sensors 215 communicate with an intermediary device, such as, for example, a memory card, and the computing device 202 communicates with the intermediary device to receive the temperature measurement data. The four thermocouples illustrated in FIG. 2 represent an example type, number, and position of the temperature sensors 215 included in the test motor 201. In other embodiments, a different number of temperature sensors may be used, and the temperature sensors 215 may be positioned in various locations on the stator windings 208 or on other components of the test motor 201.

In addition to receiving the temperature measurement data from the plurality of temperature sensors 215, the computing device 202 also receives one or more motor operating condition signals of the test motor 201. The motor operating condition signals may be transmitted to the computing device 202 wirelessly, via a wired connection, or a combination thereof. For example, in some embodiments, the motor operating condition signals are transmitted via a communication path 230. In some embodiments, the communication path 230 is the same communication path used by the plurality of temperature sensors 215 to transmit the temperature measurement data (the communication path 225). In other embodiments, however, a separate communication path is used by the computing device 202 to receive the temperature measurement data and the motor operating condition signals. The motor operating condition signals received by the computing device 202 represent operating conditions of the test motor 201 distinct from the direct temperature readings associated with the temperature sensors 215. The motor operating condition signals represent one or more conditions of the test motor 201, including, for example, rotational speed (e.g., revolutions per minute (RPM)), a switching frequency, a phase current, a direct current (DC) bus voltage, a modulation index, a power factor, a coolant temperature, or a combination thereof. The motor operating condition signals are generated by monitoring one or more properties of the test motor 201 using, for example, one or more sensors. For example, a rotational speed operating condition signal may be generated by a Hall Effect Sensor, a tachometer, a rotary encoder, or the like. Similarly, a phase current may be measured with a current sense resistor and a thermocouple, a thermistor, a resistance temperature detector, or the like positioned in a path of the coolant may be used to sense a coolant temperature.

Figure 3A:
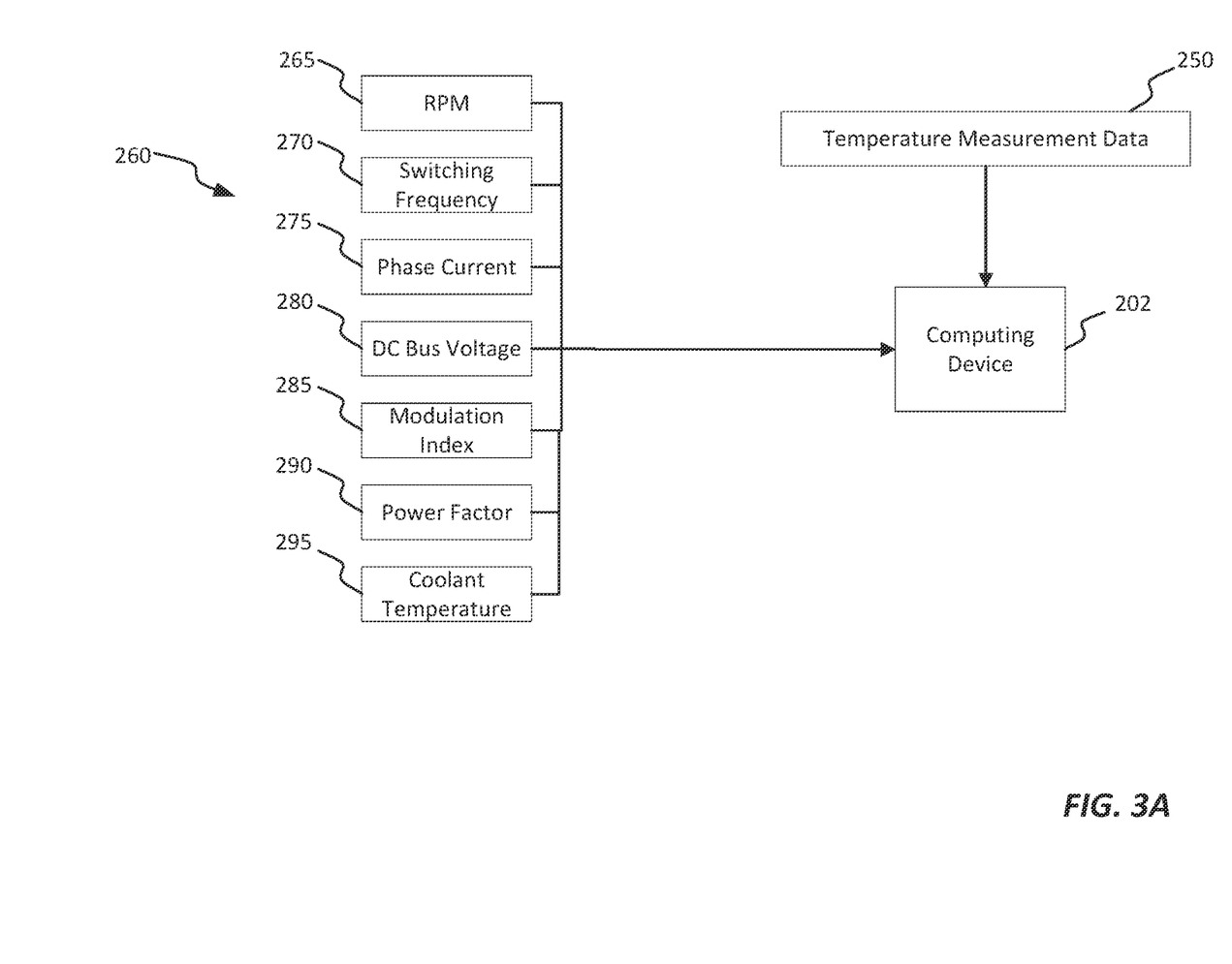
FIG. 3A schematically illustrates inputs and output of a correlation model according to some embodiments.

FIG. 3A schematically illustrates inputs received via the computing device 202. As illustrated in FIG. 3A, the inputs include temperature measurement data 250 received from the plurality of temperature sensors 215 and one or more motor operating condition signals 260. In some embodiments, the motor operating condition signals 260 include a rotational speed (e.g., RPM) signal 265, a switching frequency signal 270, a phase current signal 275, a DC bus voltage signal 280, a modulation index signal 285, a power factor signal 290, a coolant temperature signal 295, or a combination thereof.

The computing device 202 uses the temperature measurement data 250 and the motor operating condition signals 260 to generate a correlation model that maps motor operating condition signals to temperature measurement data, such that, based on received motor operating condition signals (and, optionally, temperature measurement data from actual temperature sensors mounted on a motor), the correlation model outputs one or more hypothetical temperature readings for one or more hypothetical temperature sensors. Accordingly, the correlation model, once generated, can be used to generate hypothetical temperature measurement data, which reduces or eliminates the need for multiple temperature sensors on a motor to accurate detect hotspots.

Figure 3B:
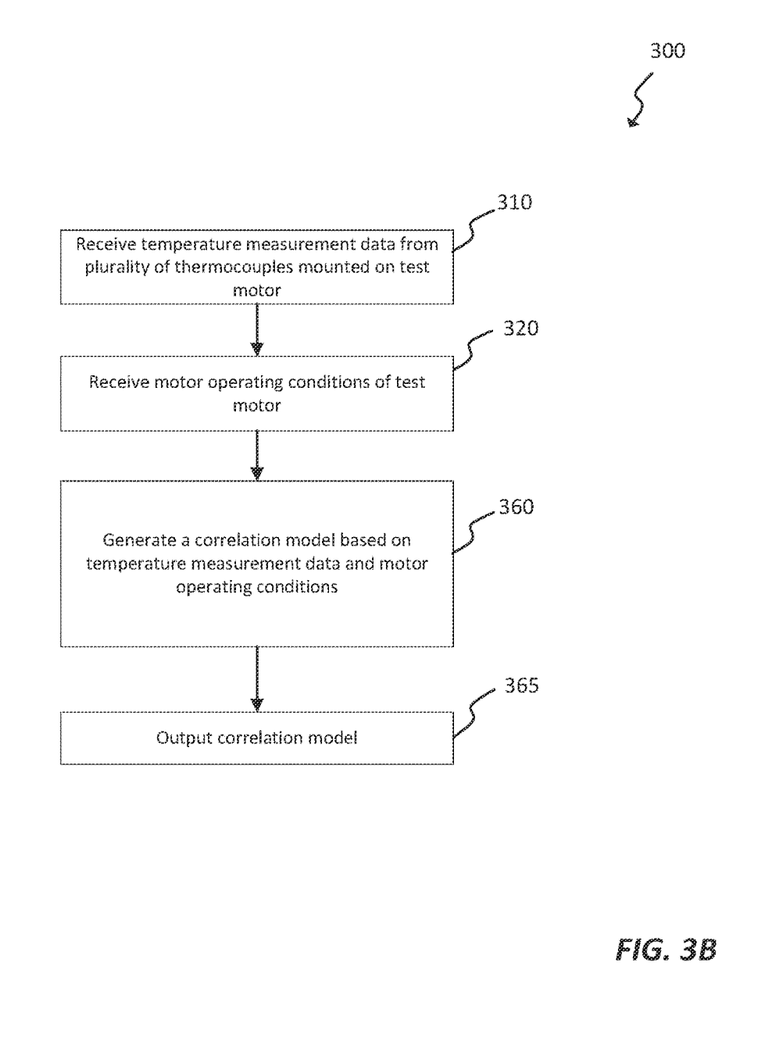
FIG. 3B is a flow chart illustrating a method of generating a correlation model via the system of FIG. 2 according to some embodiments.

FIG. 3B is flow chart illustrating a method 300 of generating a correlation model according to one embodiment. The method 300 is described as being performed via the computing device 202. However, it should be understood that the functionality may be distributed among multiple devices, such as multiple computing devices (including, for example, a cloud computing environment).

As illustrated in in FIG. 3B, the method 300 includes receiving, with the computing device 202, temperature measurement data 250 from the plurality of temperature sensors 215 mounted on or otherwise coupled to the test motor 201 (at BLOCK 310). The computing device 202 also receives the motor operating condition signals 260 of the test motor 201 (at BLOCK 320). As noted above, the motor operating condition signals 260 may include, in some embodiments, the RPM signal 265, the switching frequency signal 270, the phase current signal 275, the DC bus voltage signal 280, the modulation index signal 285, the power factor signal 290, the coolant temperature signal 295, or a combination thereof. As illustrated in FIG. 3B, the computing device 202 generates a correlation model based on the motor operating condition signals 260 of the test motor 201 and the temperature measurement data 250 (at BLOCK 360), which is output for storage and use or deployment in additional devices, such as a controller of a motorcycle including a motor (at BLOCK 365). Use of a generated correlation model is described below with respect to FIG. 6.

In some embodiments, the computing device 202 generates the correlation model by associating one or a set of motor operating condition signals with a particular temperature reading (or range a thereof). For example, the computing device 202 may be configured to associate a high value of the RPM signal 265 with particular temperature measurement data (a particular temperature reading or a range thereof) of one or more of the plurality of temperature sensors 215. In other embodiments, multiple operating conditions are associated with one or more temperature measurements. For example, the correlation model may associate several temperature measurements with the RPM signal 265 and the power factor signal 290 exceeding one or more predetermined thresholds. For example, based on the received temperature measurement data, the correlation model may associate temperature readings in a particular range for one or more temperature sensors when the RPM signal 265 exceeds a first threshold and the power factor signal 290 exceeds a second threshold. Accordingly, when the correlation model subsequently receives an RPM signal 265 and a power factor signal 290 for a motor that exceed the first and second thresholds, respectively, the correlation model can output a predicted temperature (or temperature range) for one or more temperature sensors mounted on particular locations on the motor, which, as described in more detail below, allows fewer temperature sensors to be used with the motor.

In some embodiments, the correlation model uses a polynomial equation to correlate temperature measurement data with motor operating condition signals. For example, the polynomial equation may represent the relationship between motor operating condition signals and temperature measurement data. For example, in some embodiments, the computing device 202 is configured to use a polynomial generator, such as, for example, the MATLAB polynomial vector generator, which may use the motor operating condition signals and the temperature measurement data as coefficients within the polynomial. In other embodiments, the computing device 202 may use other mechanisms to generate the correlation model, such as, for example, polynomial regression, a look up table, a matrix, one or more equations, or the like. Also, in some embodiments, the computing device 202 may use one or more machine learning techniques to automatically build the correlation map. For example, a neural network may be trained using the temperature measurement data and the motor operating condition signals associated with the test motor 201 in a supervised learning environment such that, when trained, the neural network outputs temperature measurement data given values of the motor operating signals as input.

As noted above, with motor operating condition signals correlated to temperature measurement data, the correlation model is configured to generate hypothetical temperature measurement data associated with a motor based on operating conditions of the motor. Accordingly, as described in more detail below, the correlation model can be used to reduce the number of or even eliminate the need for any temperature sensors on a motor. For example, the correlation model may be used to perform hotspot identification for a motor included in a vehicle, such as a motorcycle, without requiring a large number (or any) temperature sensors mounted on the motor, which results in lower costs, lower weight, and lower complexity.

Figure 4:
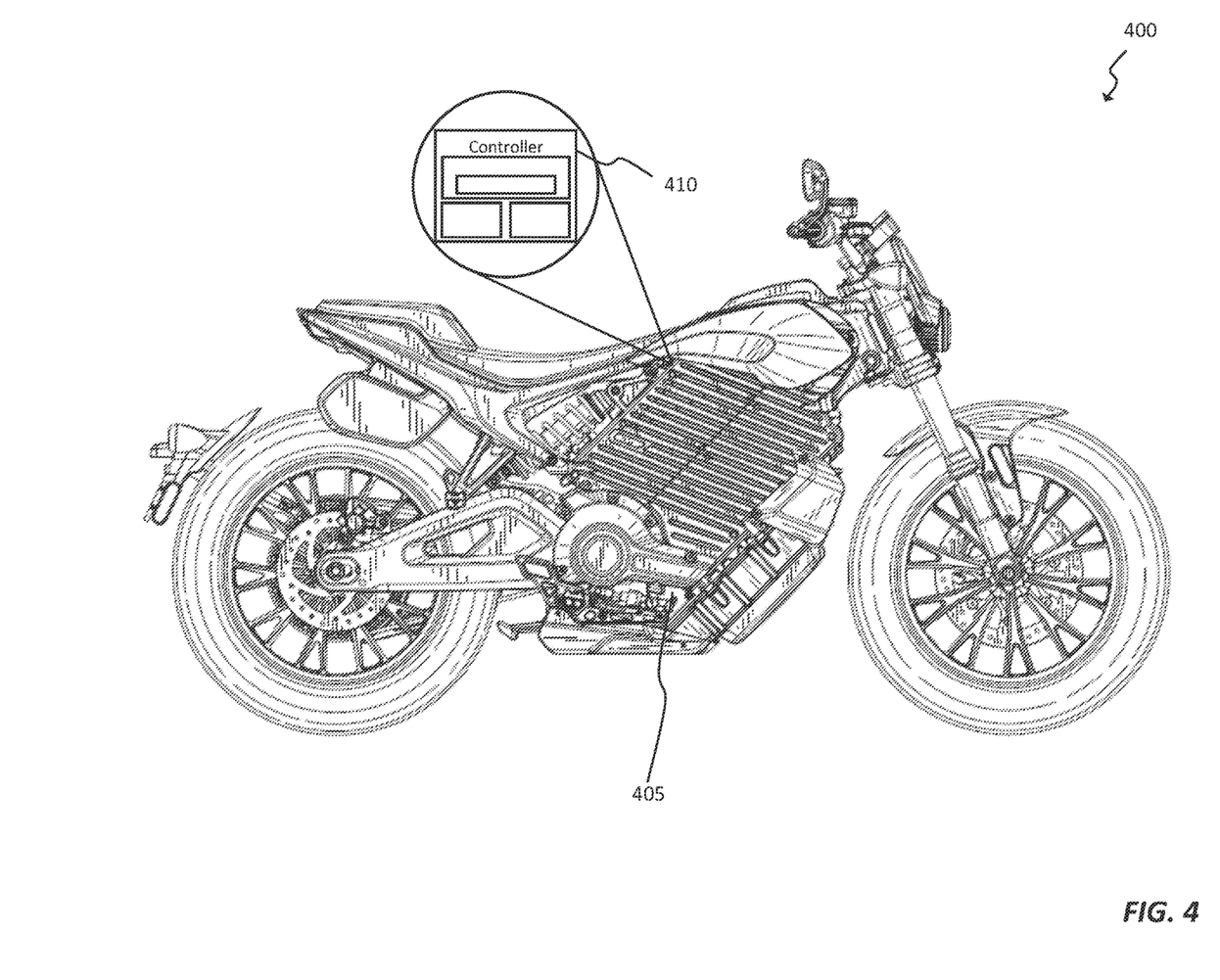
FIG. 4 is a planar view of motorcycle with a motor according to some embodiments.

For example, FIG. 4 is a planar view of a motorcycle 400. The motorcycle 400 includes an operating motor 405. In some embodiments, the operating motor 405 is the test motor 201, which was used to generate the correlation model as described above. However, in other embodiments, the test motor 201 is used to generate a correlation model for use with a plurality of different motors installed in a plurality of different motorcycles. Accordingly, in some embodiments, the operating motor 405 is a different motor than the test motor 201. However, the operating motor 405 may include similar components and a similar construction as the test motor 201 to improve accuracy of the correlation model used by the operating motor 405. As illustrated in FIG. 4, the motorcycle 400 also includes a controller 410, which may be mounted at various locations of the motorcycle 400.

Figure 5:
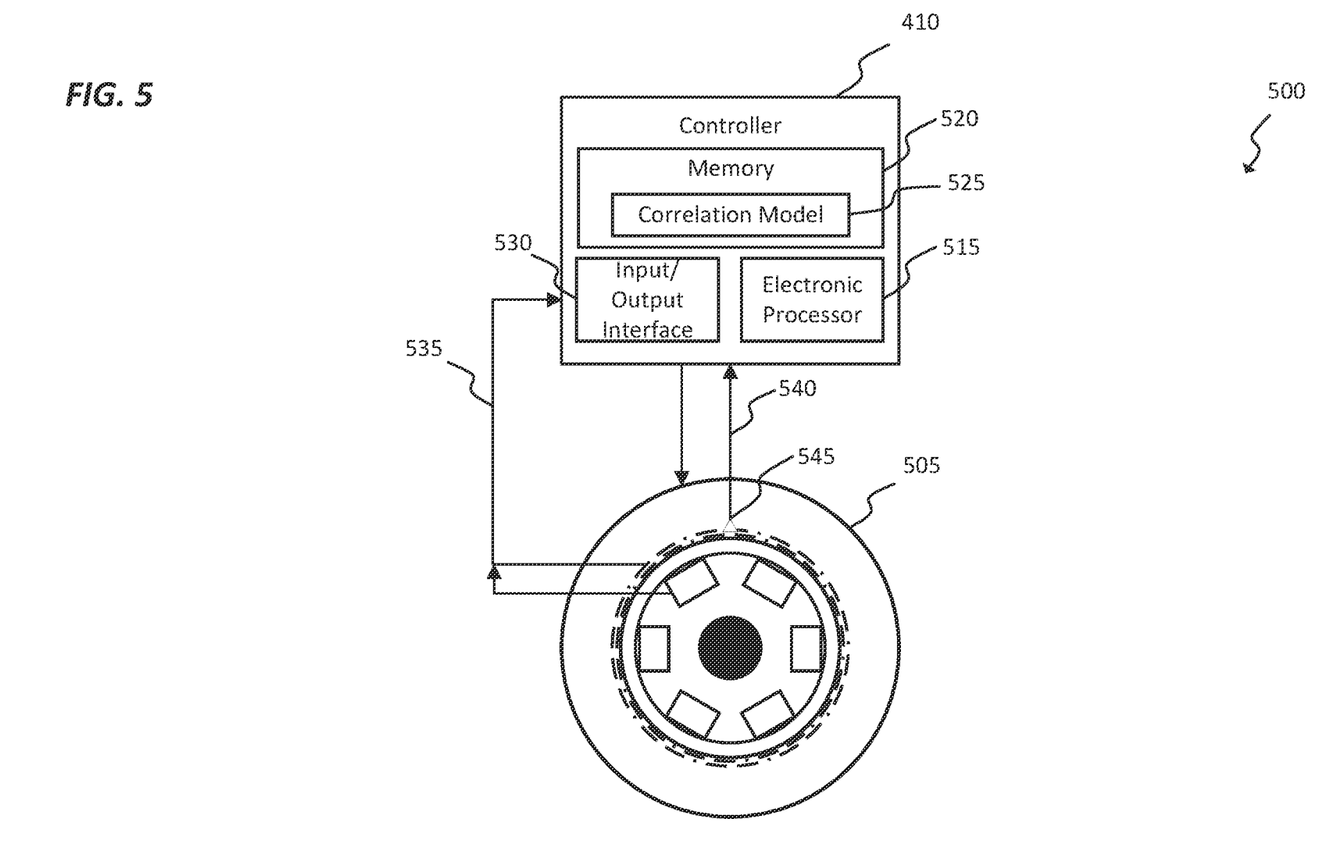
FIG. 5 schematically illustrates a system for identifying a hotspot of a motor included in the motorcycle of FIG. 4 according to some embodiments.

As illustrated in FIG. 5, the controller 410 includes an electronic processor 515, such as a microprocessor, an application-specific integrated circuit, or the like, and non-transitory, computer-readable memory 520. In some embodiments, the memory 520 stores instructions executable by the electronic processor 515 to perform hotspot identification as described herein. In some embodiments, the memory 520 also stored a correlation model 525 generated as described above. The memory 520 may also store inputs received via the controller 410 and input into the correlation model 525 as described below. As illustrated in FIG. 5, the controller 410 also includes an input/output interface 530 for communicating with the operating motor 405 or components thereof over one or more wired or wireless communication channels or networks. For example, in some embodiments, the controller 410 is configured to receive motor operating condition signals associated with the operating motor 405 via a communication bus 535. The motor operating condition signals associated with the operating motor 405 may include similar signals as described above with respect to the test motor 201. In some embodiments, the controller 410 is also configured to receive temperature measurement data from one or more temperature sensors 545 mounted on the operating motor 405, such as one or more thermocouples, via a communication bus 540. As described in more detail below, the controller 410 may also be configured to regulate the operating motor 405 in response to detecting a hotspot within the operating motor 405. For example, in some embodiments, in response to detecting a hotpot within the operating motor 405 (using temperature measurement data from the one or more temperature sensors 545, motor operating condition signals associated with the operating motor 405, and output from the correlation model 525), the controller 410 derates the operating motor 405. In other embodiments, a separate controller included in the motorcycle 400 handles hotspots identified via the controller 410, wherein the controller 410 modifies operation of the operating motor 405 by transmitting a motor operating condition signal or temperature measurement data to the separate controller.

Figure 6:
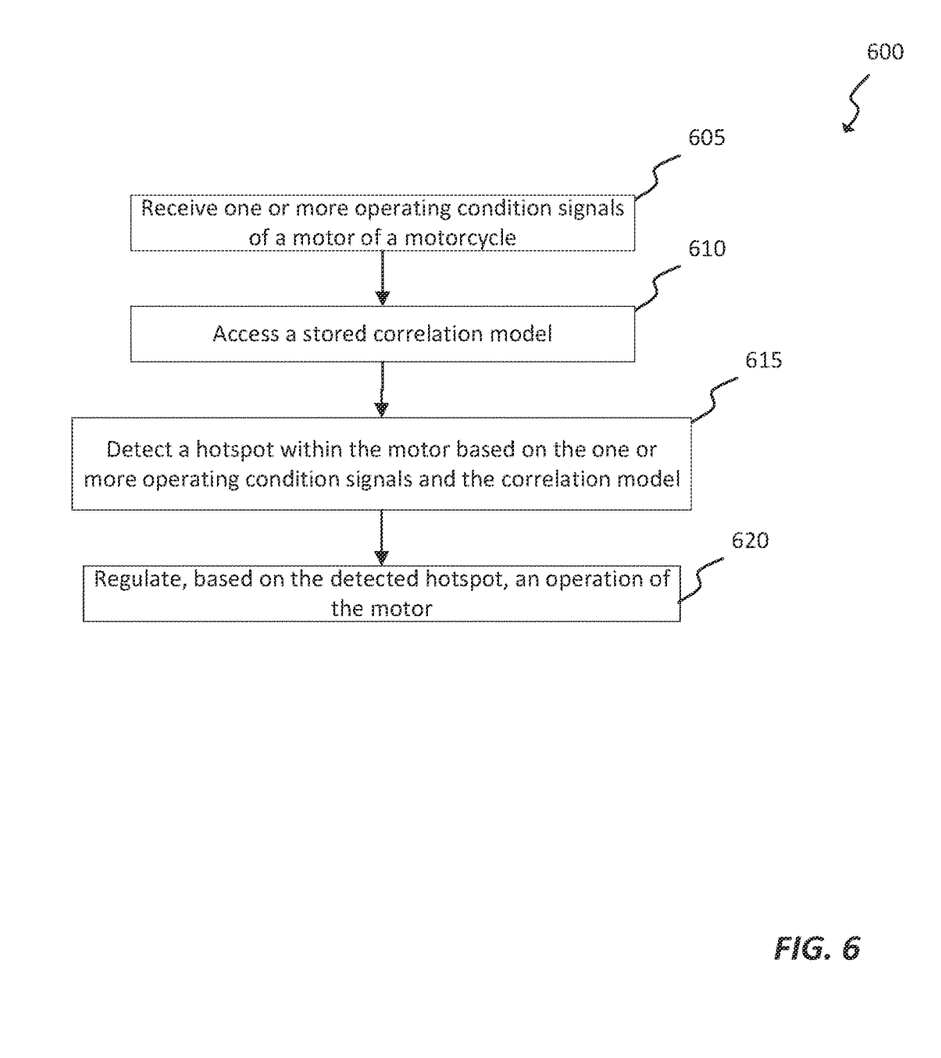
FIG. 6 is a flowchart illustrating a method of performing motor hotspot identification using the system of FIG. 5 according to some embodiments.

FIG. 6 is a flowchart illustrating a method 600 of identifying a hotspot within the operating motor 405 using the correlation model 525 according to one embodiment. The method 600 is described as being performed by the controller 410. However, it should be understood that the functionality described with respect to the method 600 may be distributed among multiple controllers (for example, multiple controllers included in the motorcycle 400).

As illustrated in FIG. 6, the controller 410 receives one or more motor operating condition signals associated with the operating motor 405 (at BLOCK 605). Optionally, the controller 410 also receives temperature measurement data from the one or more temperature sensors 545 mounted on the operating motor 405. As noted above, the correlation model 525 allows a reduced number of temperature sensors to be used with the operating motor 405 and, in some embodiments, eliminates the need for any temperature sensors. Accordingly, in some embodiments, the controller 410 only receives the motor operating condition signals associated with the operating motor 405 and does not receive any temperature measurement data representing directly measured temperatures of the operating motor 405.

As illustrated in FIG. 6, controller 410 accesses the correlation model 525 (at BLOCK 610) and uses the correlation model 525, the motor operating condition signals associated with the operating motor 405, and, optionally, the temperature measurement data received from the one or more temperature sensors 545, to determine whether a hotspot exists within the operating motor 405 (at BLOCK 615). For example, in some embodiments, the controller 410 uses the correlation model 525 to generate hypothetical temperature measurement data representing one or more hypothetical temperature readings for one or more hypothetical temperature sensors. The hypothetical temperature measurement data can be used similar to how actual (directly measured) temperature measurement data is used to identify motor hotspots. For example, in some embodiments, a hypothetical temperature measurement is compared to a predetermined temperature threshold. In response to the hypothetical temperature measurement exceeding the predetermined temperature threshold, the controller 410 determines that a hotspot exists within the operating motor 405. As illustrated in FIG. 6, in this situation, the controller 410 may regulate operation of the operating motor 405. In some embodiments, regulating operation of the operating motor 405 includes changing the RPM of the operating motor 405, such as by derating the operating motor 405.

Accordingly, embodiments described herein generate a correlation model based on empirical temperature measurement data and motor operating condition signals associated with a test motor, wherein the temperature measurement data includes temperature readings generated by a plurality of temperature sensors (thermocouples) mounted on the test motor. The generated correlation model can subsequently be used with an operating motor that includes fewer temperature sensors than the test motor (e.g., a single temperature sensor or even no temperature sensors) to accurately detect motor hotspots. In particular, using motor operating conditions signals of the operating motor and, optionally, temperature measurement data from one or more temperature sensors mounted on the operating motor, one or more hypothetical temperature readings can be generated, which can be used similar to a temperature reading from an actual temperature sensor, to detect motor hotspots and respond accordingly. Thus, the correlation model provides accurate motor hotspot identification for an operating motor while allowing the operating motor to include fewer (or even no) temperature sensors as compared to the test motor, which reduces cost, complexity, and weight.

Various features and advantages of some implementations are set forth in the following claims.

What is claimed is:

1. A system for motor hotspot identification, the system comprising:
a first motor installed in a vehicle, the first motor including a rotor and a stator having at least one stator winding corresponding to at least one phase of the first motor;
a first set of temperature sensors coupled to the first motor; and
a controller installed in the vehicle, the controller configured to:
receive a motor operating condition signal associated with the first motor,
access a stored correlation model,
generate hypothetical temperature measurement data for a hypothetical temperature sensor based on the stored correlation model and the motor operating condition signal associated with the first motor, the stored correlation model generated based on motor operating condition signals associated with a second motor operating in a test environment and temperature measurement data received from a second set of temperature sensors coupled to the second motor, the first set of temperature sensors including fewer temperature sensors than the second set of temperature sensors, and
in response to identifying a hotspot within the first motor installed in the vehicle based on the hypothetical temperature measurement data, modify operation of the first motor.

2. The system of claim 1, wherein the motor operating condition signal associated with the first motor includes at least one selected from a group consisting of a rotational speed signal, a switching frequency signal, a direct current bus voltage signal, a modulation index signal, a power factor signal, and a coolant temperature signal.

3. The system of claim 1, wherein the first set of temperature sensors includes a single temperature sensor.

4. The system of claim 1, wherein the controller is further configured to receive temperature measurement data from the first set of temperature sensors and wherein the controller is configured to generate the hypothetical temperature measurement data for the hypothetical temperature sensor based on the stored correlation model, the motor operating condition signal associated with the first motor, and the temperature measurement data received from the first set of temperature sensors.

5. The system of claim 1, wherein the stored correlation model includes a polynomial equation.

6. The system of claim 1, wherein the controller is configured to modify operation of the first motor by derating the first motor.

7. The system of claim 1, wherein the motor operating condition signal associated with the first motor includes a phase current signal associated with the at least one phase of the first motor.

8. The system of claim 1, wherein the controller is further configured to:
compare the hypothetical temperature measurement data to a predetermined temperature threshold; and
identify the hotspot within the first motor installed in the vehicle in response to the hypothetical temperature measurement data exceeding the predetermined temperature threshold.

9. The system of claim 1, wherein the hypothetical temperature measurement data includes a temperature range.

10. A method of generating a correlation model for performing motor hotspot identification, the method comprising:
receiving, with an electronic processor, from each of a plurality of temperature sensors coupled to a test motor, temperature measurement data;
receiving, with the electronic processor, a motor operating condition signal associated with the test motor;
generating, with the electronic processor, the correlation model based on the temperature measurement data received from each of the plurality of temperature sensors and the motor operating condition signal associated with the test motor, the correlation model mapping the motor operating condition signal to the temperature measurement data received from at least one of the plurality of temperature sensors; and deploying the correlation model to a vehicle including an operating motor, wherein the operating motor included in the vehicle includes fewer temperature sensors than a number of temperature sensors included in the plurality of temperature sensors and wherein the correlation model is configured to generate hypothetical temperature measurement data for the operating motor included in the vehicle based on a motor operating condition signal associated with the operating motor included in the vehicle, the hypothetical temperature measurement data used to detect a hotspot within the operating motor.

11. The method of claim 10, wherein the motor operating condition signal associated with the test motor includes at least one selected from a group consisting of a rotational speed signal, a switching frequency signal, a direct current bus voltage signal, a modulation index signal, a power factor signal, and a coolant temperature signal.

12. The method of claim 10, wherein the motor operating condition signal associated with the operating motor includes a phase current signal associated with at least one phase of the operating motor.

13. The method of claim 10, wherein the hypothetical temperature measurement data includes a temperature range.

14. The method of claim 10, wherein generating the correlation model includes generating a polynomial equation.

15. The method of claim 10, wherein generating the correlation model includes generating a look up table.

16. The method of claim 10, wherein generating the correlation model includes training a neural network.

17. A non-transitory computer-readable medium storing instructions, that when executed by an electronic processor, perform a set of functions, the set of functions comprising:

receiving, from an operating motor, a motor operating condition signal of the operating motor, the motor operating condition signal being at least one selected from a group consisting of a rotational speed signal, a switching frequency signal, a phase current signal, a direct current bus voltage signal, a modulation index signal, a power factor signal, and a coolant temperature signal;

generating, using a stored correlation model and the motor operating condition signal, hypothetical temperature measurement data for the operating motor for a hypothetical temperature sensor, the stored correlation model generated based on motor operating condition signals associated with a test motor operating in a test environment and temperature measurement data received from a plurality of temperature sensors coupled to the test motor;

detecting a hotspot within the operating motor based on the hypothetical temperature measurement data; and regulating operation of the operating motor in response to detecting the hotspot.

18. The non-transitory computer-readable medium of claim 17, wherein the stored correlation model includes a polynomial equation.

19. The non-transitory computer-readable medium of claim 17, wherein a number of the plurality of temperature sensors coupled to the test motor is greater than a number of temperature sensors coupled to the operating motor.

20. The non-transitory computer-readable medium of claim 17, wherein no temperature sensors are coupled to the operating motor.

* * * * *